Patented Sept. 22, 1925.

1,554,699

UNITED STATES PATENT OFFICE.

PAUL W. ALLEN, OF CEDAR RAPIDS, IOWA, ASSIGNOR, BY MESNE ASSIGNMENTS, TO PENICK & FORD, LTD., INCORPORATED, A CORPORATION OF DELAWARE.

STARCH.

No Drawing. Application filed February 17, 1919. Serial No. 277,580.

*To all whom it may concern:*

Be it known that I, PAUL W. ALLEN, a citizen of the United States, residing at Cedar Rapids, in the county of Linn and State of Iowa, have invented certain new and useful Improvements in Starch, of which the following is a specification.

My invention relates to starch, and its object is to provide a treatment for starch whereby the starch, for example, corn starch, is made capable of absorbing and retaining several times its own weight of water. Ordinary corn starch will absorb little if any more than its own weight of water. Starch has been treated in accordance with this invention to make it absorbent to the extent of ten times its own weight. Starch having this property has considerable utility, for example, in the baking industry. The use of a small quantity of it in wheat bread, to give a single instance, will serve to keep the bread moist besides making it more digestible.

The product is made preferably as follows: Ordinary table starch, that is, corn starch taken from the settling tables, is mixed with water and acid to form a starch milk. The starch milk is subjected in small quantities to a sudden and short application of heat which drives off the moisture and so changes the starch granules with little or no modification or conversion (using these terms in their ordinary significations) as to give the product the desired absorbent property. For example, 1000 pounds of starch, calculated on a dry basis, may be mixed with 3000 pounds of water and 4.2 pounds of chemically pure hydrochloric acid of a specific gravity of 1.19 (or a proportionately larger amount of commercial hydrochloric acid) or other acid. This mixture is then sprayed upon the outer surface of a hollow, revolving drum within which steam is maintained at, say, 60 pounds pressure. The product will be dried and may be scraped from the drum after a period of from one-half a minute to one minute from the time of spraying thereon.

Starch treated in this manner is capable of absorbing approximately ten times its weight of water. It is substantially insoluble in water, that is its solubility is very low, only about 3.8 per cent being soluble in water at 20° centigrade. The treatment of the starch produces substantially no sugar or dextrine. The product gives the characteristic blue reaction when tested with iodine. The treatment ruptures the starch cells. Microscopic examination shows that the product is amorphous, not cellular.

It will be understood that the directions for making the product, as given above, may be modified as to proportions, temperature and time without departure from the invention. The application of heat to the starch milk by spraying the milk on a rotating steam-heated drum is considered to be the most economical way of treating the material, but other expedients can be employed which will bring about the same result, as will be apparent to those skilled in this general art.

I claim:

1. Corn starch substantially free from sugar and dextrine and having a solubility not substantially in excess of 3.8% in water at 20° centigrade and capable of absorbing approximately ten times its own weight of water.

2. Method of manufacturing a product having the property described which consists in mixing starch with water and an acid and subjecting the mixture to a temperature and for a period of time which will bring about the drying out of the moisture and the rupture of the starch cells without modifying any substantial portion of the starch to solubility or converting any substantial part of it to dextrine or dextrose.

3. Method of manufacturing a product having the property described, which consists in mixing starch, water and hydrochloric acid in the following proportion: 1000 pounds of dry starch, 3000 pounds of water and 4.2 pounds of chemically pure hydrochloric acid, of a specific gravity of 1.19, spraying the mixture on a metallic surface heated by contact with steam at approximately 60 pounds pressure, and removing the material from such surface after a period of from one-half to one minute.

PAUL W. ALLEN.